United States Patent [19]

Liu et al.

[11] Patent Number: 5,128,573
[45] Date of Patent: * Jul. 7, 1992

[54] ROTOR BEARING FOR SUBMERSIBLE PUMP MOTOR

[75] Inventors: Joseph C. Liu, Tulsa; Donald C. Watson, Broken Arrow, both of Okla.

[73] Assignee: Oil Dynamics, Inc., Tulsa, Okla.

[*] Notice: The portion of the term of this patent subsequent to Mar. 26, 2008 has been disclaimed.

[21] Appl. No.: 667,820

[22] Filed: Mar. 12, 1991

Related U.S. Application Data

[63] Continuation-in-part of Ser. No. 453,682, Dec. 20, 1989, Pat. No. 5,003,210.

[51] Int. Cl.[5] .............................. H02K 5/16
[52] U.S. Cl. ................................ 310/87; 310/90
[58] Field of Search ....................... 310/87, 90, 42

[56] References Cited

U.S. PATENT DOCUMENTS

| Re. 28,094 | 7/1974 | Boyd | 310/90 |
| 641,106 | 1/1900 | Hawksworth | 384/906 |
| 3,433,986 | 3/1969 | Arutunoff | 310/87 |
| 3,551,714 | 12/1970 | Boyd | 310/87 |
| 4,046,432 | 8/1977 | Hofmann et al. | 308/189 |
| 4,435,661 | 3/1984 | Witten | 310/90 |
| 4,453,099 | 6/1984 | Flat | 310/87 |
| 4,513,215 | 4/1985 | Del Serra | 310/90 |
| 4,521,708 | 6/1985 | Vandevier | 310/87 |
| 5,003,210 | 3/1991 | Liu et al. | 310/87 |

Primary Examiner—R. Skudy
Assistant Examiner—D. L. Rebsch
Attorney, Agent, or Firm—Head & Johnson

[57] ABSTRACT

A submersible motor includes a stator section along the entire length of rotor sections attached to the motor shaft, with a rotor bearing and sleeve assembly between each rotor section, each bearing including a fixed key for positioning in longitudinal spacings formed as a part of the stator section, to prevent rotation of the bearing during use.

9 Claims, 3 Drawing Sheets

ROTOR BEARING FOR SUBMERSIBLE PUMP MOTOR

Related Patents

This is a continuation-in-part of co-pending application Ser. No. 07/453,682 filed Dec. 20, 1989, issued on Mar. 26, 1991 as U.S. Pat. No. 5,003,210.

BACKGROUND OF THE INVENTION

The field of this invention encompasses submersible electrical motors used to pump fluids from subterranean formations and in particular to bearings for maintaining the shaft of the rotor in alignment.

The stator and rotor are constructed in sections. Each section of steel is called a core and delivers a certain output (HP). In the stator, a stack (1.75") of bronze laminations is necessary between two steel cores. This bearing stack is known as bearing lamination.

The rotor bearings are typically made of nitralloy material. The motor is assembled so that these bearings operate in the bronze bearing lamination sections. When the motor is at room temperature, there is a small gap between the rotor bearing OD and bearing lamination ID for easy assembly and disassembly of the rotor cores and bearings relative to the stator.

As the motor temperature increases during operation, the bronze laminations with a higher thermal expansion coefficient, first expand outward—until the OD expansion is stopped by the motor housing—then grow inward (reducing the bronze lamination ID) to grasp the rotor bearings. The timing is critical. If the bearings are grasped before the shaft and rotors are fully expanded axially, a bearing failure will occur.

Since the motor winding goes through these bronze bearing laminations, a magnetic field is produced when the motor winding is energized. However, since the bronze is a nonmagnetic material, it acts as a large air gap so that the flux (magnetic lines) actually transferred through the nitralloy bearing is very limited even though the nitralloy is magnetic. With the present design, the bearing could spin until a certain operating temperature is reached.

SUMMARY OF THE INVENTION

It is an object of this invention to provide an improved rotor bearing assembly for use between rotors of a submersible electric motor.

Specifically, the invention is directed to a submersible electric motor that has particular application in producing fluids from subterranean formations, particularly oil bearing formations. The motor comprises a substantially oil-filled housing within which a shaft is rotatably supported by appropriate bearings which are well known in the art. The shaft is then connectable to a centrifugal pump and/or equipment normally found in submersible motor/pump systems. The motor typically includes a plurality of spaced rotors that are attached to the shaft. The stator section extends the full length of all of the rotors so as to surround them, the stator section being attached to the housing and comprised of a plurality of stacked laminated plates. Each of the plates which have normally been utilized in the prior art devices are comprised of the circumferential outer core portion with a plurality of spaced inwardly radial teeth forming openings for the stator windings. A rotor bearing and sleeve is positioned between rotor sections. The bearing comprises a sleeve which is keyed to rotate with the shaft. The rotor bearing is of such a dimension that its outer diameter (OD) is of slightly less diameter than the inner peripheral diameter of the radial fingers of the laminated plates.

The periphery of the bearing includes at least one and preferably two longitudinal key-like members. In one embodiment the key-like member is of a C-shape wherein the horizontal portions of the "C" extend radially inward along the upper and lower sides of the rotor bearing. In such an arrangement the key-like member will be positioned between the radial teeth of the stacked laminated plates which act as a form of key-way to prevent rotation of the rotor bearing.

DETAILED DESCRIPTION OF THE DRAWINGS

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Figures 1, 2:
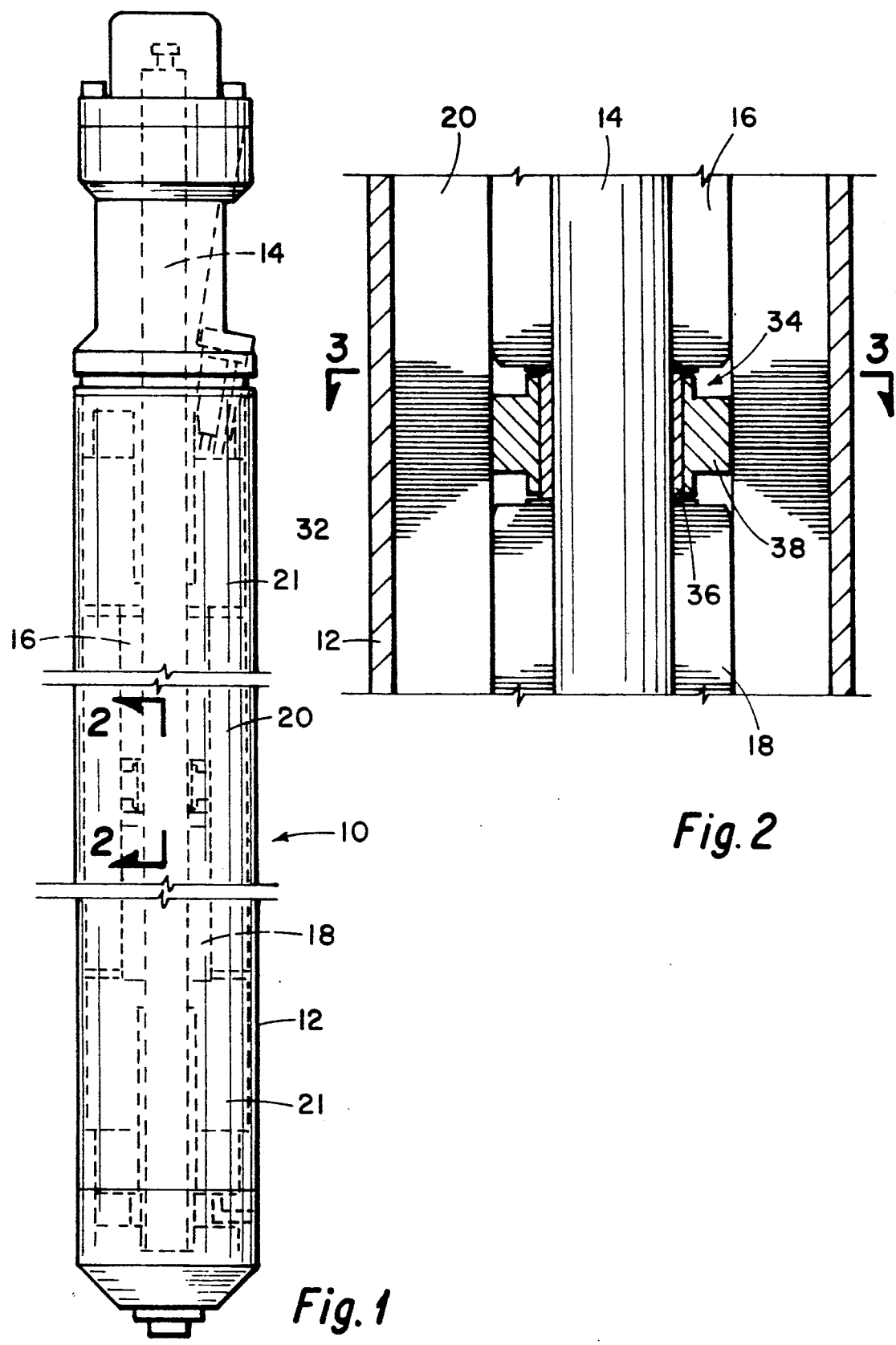
FIG. 1 is an elevational view of the submersible motor of this invention.
FIG. 2 is a longitudinal partial sectional view taken along the lines 2—2 of FIG. 1.
Figure 3:
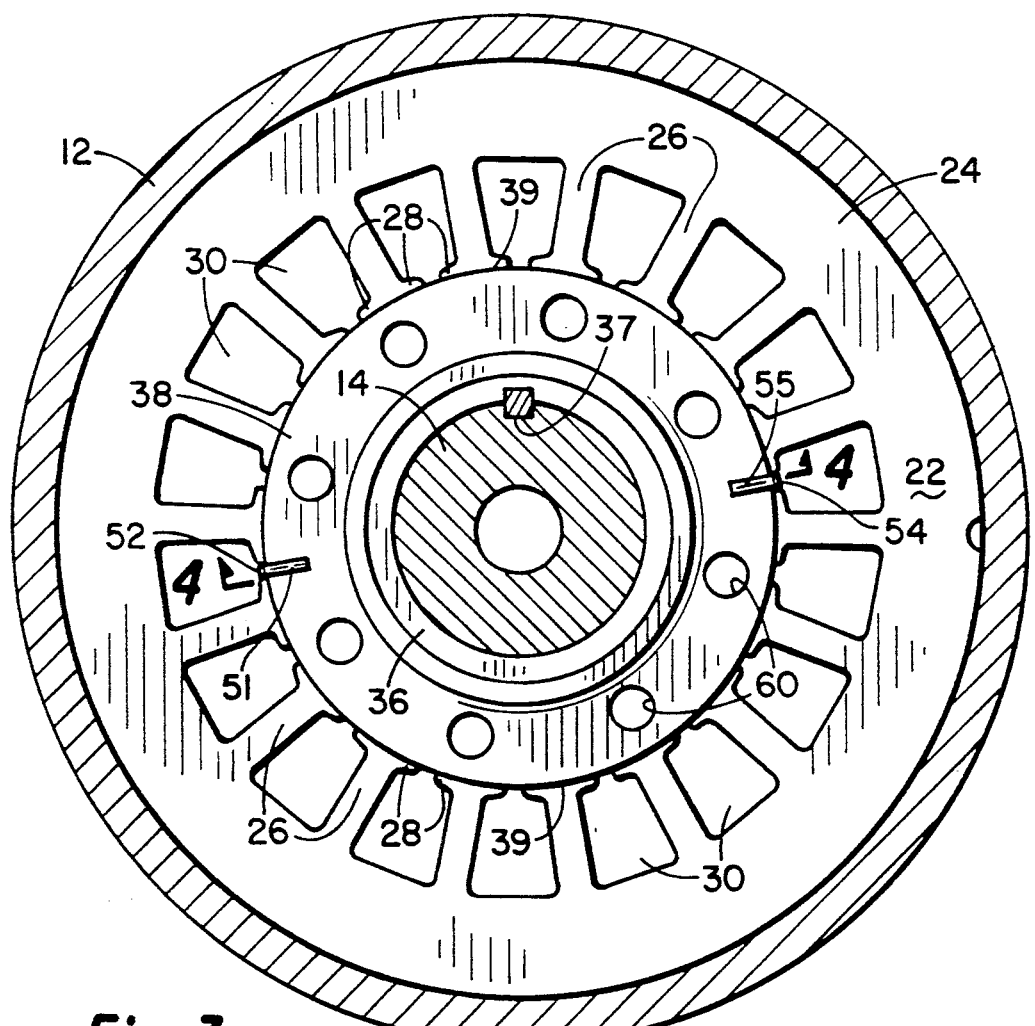
FIG. 3 is a sectional view taken along the lines 3—3 of FIG. 2.

Referring now to FIGS. 1 and 2, the concepts of the invention are disclosed. The submersible electric motor, generally identified by the numeral 10, includes a substantially oil-filled housing 12. Within the housing is a shaft 14 which is rotatably supported by appropriate bearings therein. A plurality of rotors, in this instance two, identified by the dashed lines 16 and 18 are attached to the shaft. A longitudinal stator section 20 extends the full length of all of the rotors and is attached to the housing. The stator comprises a plurality of stacked laminated plates 22 (see FIG. 3). Referring to FIG. 3, it is shown that each plate 22 comprises a circumferential outer ring 24 with a plurality of spaced inwardly radial teeth 26 which terminate inwardly with flange-like projections 28. These teeth define openings 30 to receive the stator windings, not shown.

Figure 4:
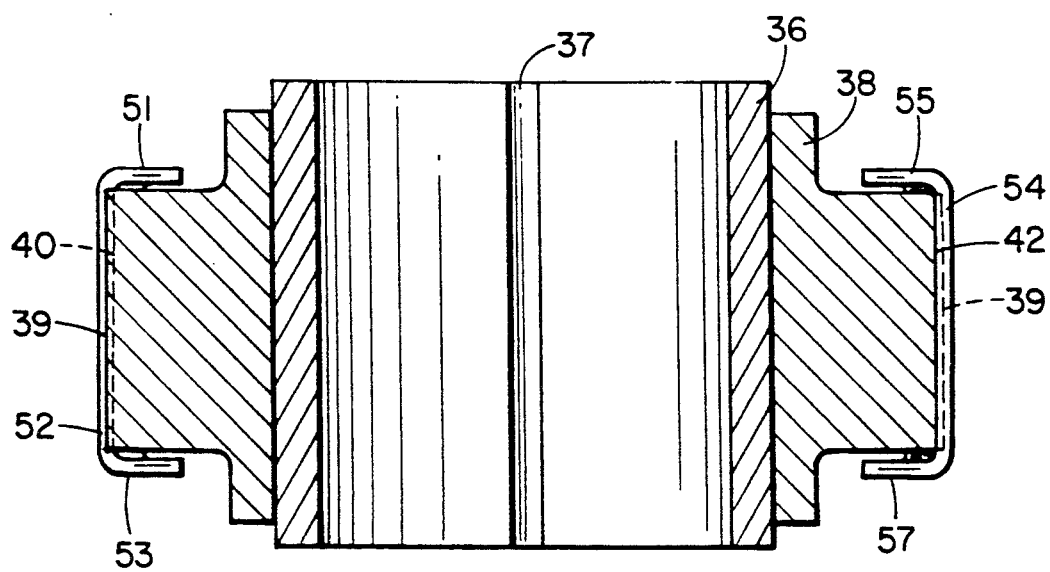
FIG. 4 is a sectional view taken along the lines 4—4 of FIG. 3.

FIGS. 2, 3, and 4 describe a rotor bearing and sleeve generally designated by the numeral 34 which consists of sleeve 36 which is keyed within key-way 37 to rotate with the shaft relative to the outer bearing 38. The outer diameter of the bearing 38 is slightly less than the inner peripheral diameter of the radial teeth 26-28 of the stacked laminated plates of the stator. Longitudinal grooves 40 and 42 are provided in the outer periphery 39 of the rotor bearing so as to receive respective C-shaped keys 52 and 54 for positioning between the radial teeth 26-28 of the stacked laminated plates and thus be prevented from rotation. In one embodiment, which is not limiting, the keys 52 and 54 are of a 0.060" square non-magnetic material, such as monel or stainless steel, positioned within 0.030" deep grooves 40 and 42. The keys are bent to form a C-shape having upper and lower respective legs 51, 53, 55 and 57. The key can be formed as a part of the bearing or, as in this embodiment, welded, brazed or glued to the bearing. Although a C-shaped key is shown, this is not to be limiting, as a straight key or L-shaped key is applicable for use with the rotor bearing.

Figure 5:
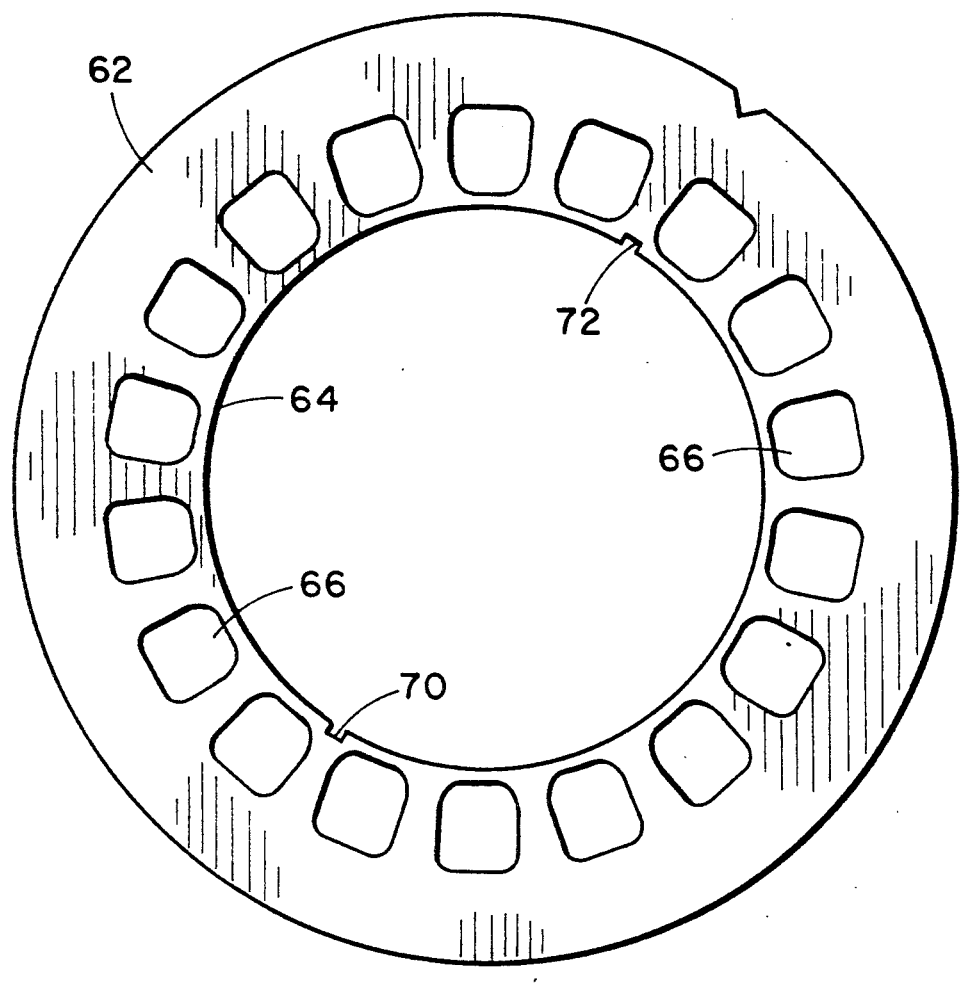
FIG. 5 is a top view of a modified stator ring for use in this invention.

Referring to FIG. 5, there is shown a stator lamination 62 having a circumferential inner ring 64 rather than teeth defining openings as shown in FIG. 3, one or more vertical grooves or key-ways 70 and 72 are to be provided in the inner ring 64 of this form of stator to coact with the keys 52 and 54. Openings 66 are provided for the windings.

What is claimed is:

1. A rotor bearing for positioning between a plurality of spaced rotors in a housed submersible electric motor, said motor having a fixed stator section extending the length of all said rotors, said rotor bearing having at least one external vertical key that lies within an imaginary radial plane of said rotor bearing for coacting with a key-way formed as a part of said stator section to prevent rotary movement of said bearing relative to said stator.

2. The assembly of claim 1 wherein said stator section comprises a plurality of stacked laminated steel plates.

3. The assembly of claim 2 wherein said plates comprise silicon steel.

4. The assembly of claim 1 wherein said rotor bearing and said sleeve comprise non-magnetic materials.

5. The assembly of claim 1 wherein said vertical key is of a C-shape with upper and lower legs that extend radically inward along respective upper and lower sides of said bearing.

6. A rotor bearing for positioning between a plurality of spaced rotors in a housed submersible electric motor, said motor having a fixed stator section extending the length of all said rotors, said rotor bearing having at least one external and fixed vertical key that lies within an imaginary radial plane of said rotor bearing for coacting with a key-way formed as a part of said stator section to prevent rotary movement of said bearing relative to said stator, said stator section comprising a plurality of laminated plates each having a circumferential outer core with a plurality of spaced inwardly radial teeth, and the outer diameter (OD) of said rotor bearing being of slightly less diameter than the inner peripheral plane of said radial teeth.

7. A submersible electric motor comprising
a substantially oil filled housing;
a shaft rotatably supported in said housing;
a plurality of spaced rotors attached to said shaft,
a stator section extending the length of all of said rotors and surrounding each said rotor, said stator being attached to said housing and comprising a plurality of stacked laminated plates, each plate comprising a circumferential outer core with a plurality of spaced inwardly radial teeth forming openings for stator windings,
a rotor bearing positioned between rotors, the outer diameter of said rotor bearing being of slightly less diameter than the inner peripheral diameter of said radial teeth of said laminated plates,
at least one groove in the OD of said rotor bearing,
a C-shaped key positioned and affixed within each said groove, the upper and lower legs of said key extending radially inward along respective upper and lower sides of said bearing, said key coacting within the space between said radial teeth of said outer laminated core to prevent rotation of said bearing.

8. The electric motor of claim 7 including a submersible rotary pump connected to said rotary shaft.

9. The electric motor of claim 7 wherein said rotor bearing includes a plurality of longitudinal openings for the flow of oil therethrough.

* * * * *